D. & K. LEWIS.
COOKING PAN.
APPLICATION FILED MAY 4, 1908.

907,154.

Patented Dec. 22, 1908.

Witnesses:
Harry D. Rapp.
Christ Feinle Jr.

Daniel Lewis,
Katharine Lewis, } Inventors.
By Emil Neuhart, Attorney

UNITED STATES PATENT OFFICE.

DANIEL LEWIS AND KATHARINE LEWIS, OF BUFFALO, NEW YORK.

COOKING-PAN.

No. 907,154.  Specification of Letters Patent.  Patented Dec. 22, 1908.

Application filed May 4, 1908. Serial No. 430,754.

*To all whom it may concern:*

Be it known that we, DANIEL LEWIS and KATHARINE LEWIS, both of Buffalo, in the county of Erie and State of New York, have invented certain new and useful Improvements in Cooking-Pans, of which the following is a specification.

Our invention relates to cooking-pans and more especially to that type of pan designed for cooking meats, or for cooking or baking other articles of food.

The primary object of our invention is the production of a one piece pan so fashioned that its dished portion is seamless and well reinforced and that all sharp corners or angles are dispensed with, thus preventing chipping of the enamel.

Another object is to so construct the pan that all parts in or on which grease and dirt can lodge will be easily accessible for cleaning.

A still further object is the production of a one-piece pan in which the sides of the pan are made of two thicknesses of metal in physical contact, with a hollow rim at the upper edge of the sides and a single supporting rim at the bottom of the pan which is an extension of the outer thickness of metal, thereby producing a very rigid yet light pan particularly designed to be enameled and in which a great saving of enamel is obtained, since the surface of the metal lying in contact requires no enameling.

With these and other objects in view, our invention consists in the novel construction of a pan illustrated in the accompanying drawings forming part of this specification, and as hereinafter described and claimed.

Figure 1:
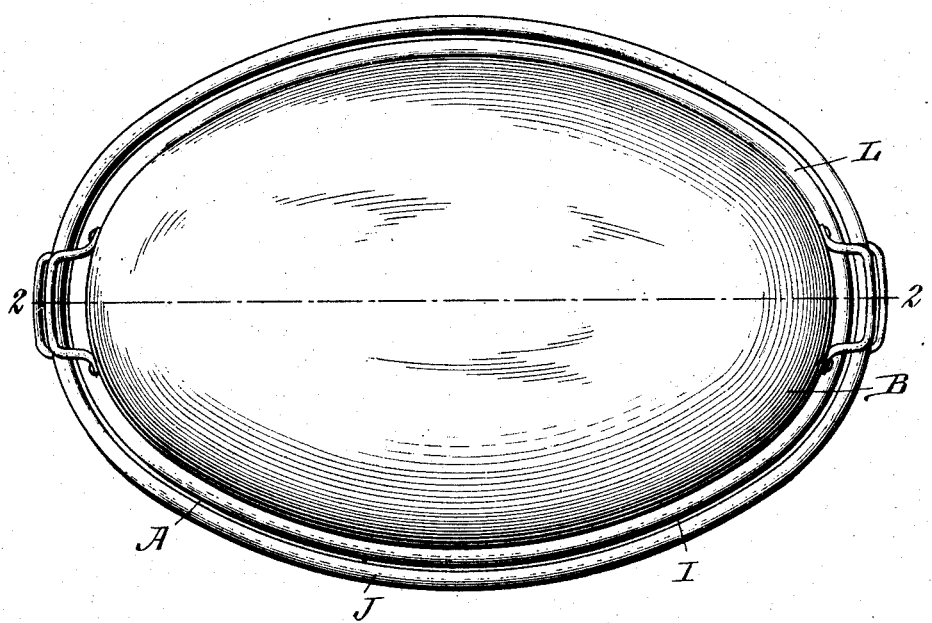
Figure 2:
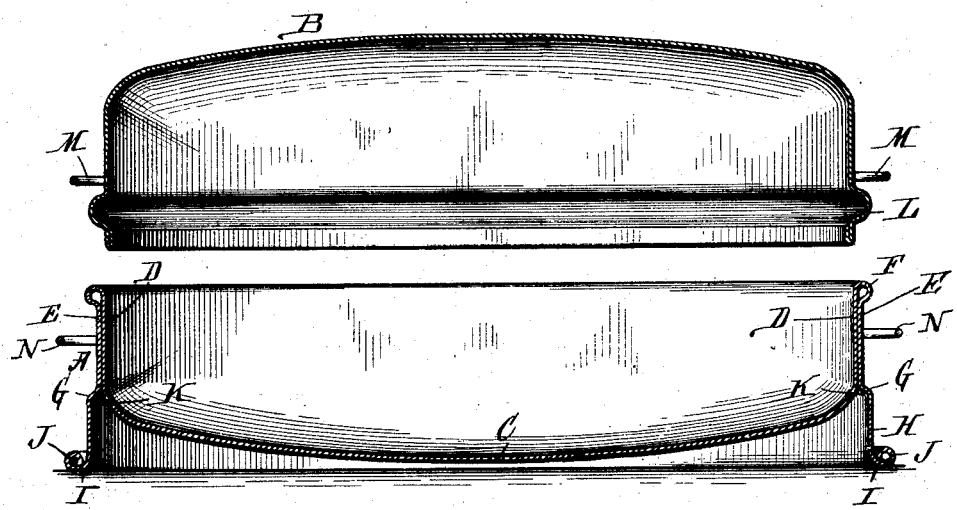

In the drawings,—Figure 1 is a top plan view of our improved pan. Fig. 2 is a longitudinal vertical section taken on line 2—2, Fig. 1; the cover being elevated out of contact with the pan proper.

The pan is preferably oval in contour and comprises a body A and a cover B. The body is formed of a single sheet of metal drawn and stamped to the desired shape. The central portion of the sheet is dished to form a concavo-convex bottom C and the vertical sides D of the dished portion, the sides merging into the bottom by curving the metal at this point, whereby sharp corners or angles are avoided.

The marginal portions of the metal sheet are bent downward around the dished portion to surround the same, as at E, and to avoid sharp corners the metal is provided with a hollow rim F where it is recurved so that a gradually rounded surface is obtained at the edge of the pan. The recurved or enveloping portion of the metal lies in physical contact with the sides of the dished portion from the hollow rim to a point where said sides merge into the bottom, at which point it is bulged outward with an ogee curve, as at G, and its lower end serves as a supporting-rim, designated H and having an outwardly curved base-flange I coiled upon itself, as at J.

By enveloping the dished-portion of the pan with the recurved marginal portion of the metal sheet, the sides of the pan are made of two thicknesses of metal, whereby the dished portion is reinforced and greatly stiffened. Moreover, the hollow rim extends beyond the surface of that portion of the outer thickness of metal lying in contact with the sides of the dished portion so that the metal is curved inward underneath the rim, which with the shoulder formed by bulging the metal at G, greatly stiffens the pan and avoids all tendency of the recurved portion spreading and moving away from the sides of the dished portion. It is also to be noted that, by bulging the recurved portion of the metal outward where it leaves the sides of the dished portion, a groove K is formed of sufficient size to enter with a wash-cloth to thoroughly clean the pan at this point.

The construction above described possesses further advantages, such as saving in enamel owing to the recurved portion of the metal sheet lying in contact with the sides of the dished portion of the pan and the quality of properly receiving and retaining the enamel without tendency to chip.

The dished portion of the pan is depressed to a plane slightly above the plane of the lower edge of the supporting rim so that when placed upon a stove or in an oven, the concavo-convex bottom will be elevated from the stove or bottom of the oven, as the case may be, and the heat retained within the space surrounded by the supporting-rim.

The cover B is formed of a single sheet of metal and is also of oval formation of slightly diminished size so that its lower edge fits into the body of the pan; it having a bead L near its lower edge which serves as a stop to limit the extent to which it enters the body. Suitable handles M and N are provided for the cover and body, respectively, so that they may be conveniently handled.

The advantages of this invention are directly attributable to the particular and novel construction of the pan, which is inexpensive to manufacture, very durable and rigid, and perfectly sanitary.

Having thus described our invention, what we claim is.

1. A cooking-pan adapted to receive a coating of enamel or the like, formed of a single sheet of metal having a central depressed portion providing a concavo-convex bottom and side walls merging into said bottom, a recurved portion surrounding said side-walls and in physical contact therewith and connected at its upper edge with the upper edges of said side walls by a hollow rim, said recurved portion terminating in a supporting rim whose lower edge is in a plane beneath the lowest point of said concavo-convex bottom.

2. A cooking-pan adapted to receive a coating of enamel or the like, formed of a single sheet of metal having a central depressed portion providing a concavo-convex bottom and side walls merging into said bottom, and a recurved portion surrounding said side walls and providing a hollow rim at the upper edge of the pan, said recurved portion lying in contact with the side walls of said central depressed portion and being off-set where said side walls merge into said bottom to form a supporting-rim.

3. A cooking-pan adapted to receive a coating of enamel or the like, formed of a single sheet of metal having a central depressed portion surrounded by a recurved portion in physical contact with the sides of said depressed portion and connected with the upper edge of said depressed portion by a hollow rim extending out beyond the outer surface of the adjacent portions of said recurved portion.

4. A cooking-pan adapted to receive a coating of enamel or the like, formed of a single sheet of metal having a central depressed portion providing a concavo-convex bottom and side walls merging into said bottom, and a recurved portion surrounding said side walls and providing a hollow rim at the upper edge of the pan, said recurved portion lying in contact with the side walls of said central depressed portion and being bulged outward where said side walls merge into said bottom to form a supporting-rim.

5. A cooking-pan adapted to receive a coating of enamel or the like, formed of a single sheet of metal having a central depressed portion providing a concavo-convex bottom and side walls merging into said bottom, and a recurved portion surrounding said side walls and providing a hollow rim at the upper edge of the pan, said recurved portion lying in contact with the side walls of said central depressed portion and being off-set where said side walls merge into said bottom to form a supporting-rim, said supporting-rim having an outstanding flange formed by curving the lower marginal portion thereof outward and curving the flange upon itself.

In testimony whereof, we have affixed our signatures in the presence of two subscribing witnesses.

DANIEL LEWIS.
KATHARINE LEWIS.

Witnesses:
EMIL NEUHART,
ELLA C. PLUECKHAHN.